Oct. 24, 1961 J. P. STEIBEL 3,005,444
CONTROL MEANS FOR FLUID ACTUATED WORK CYLINDERS
Filed July 27, 1959 2 Sheets-Sheet 1

Inventor:
James P. Steibel
By Zabel, Baker, York,
Jones & Dithmar
Attorneys

Oct. 24, 1961    J. P. STEIBEL    3,005,444
CONTROL MEANS FOR FLUID ACTUATED WORK CYLINDERS
Filed July 27, 1959    2 Sheets-Sheet 2
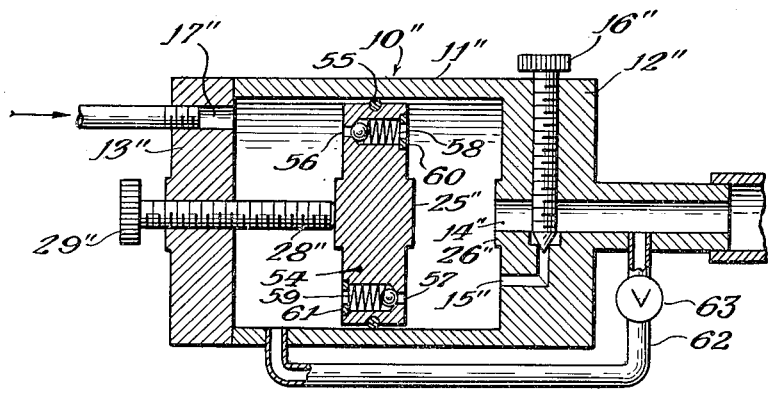
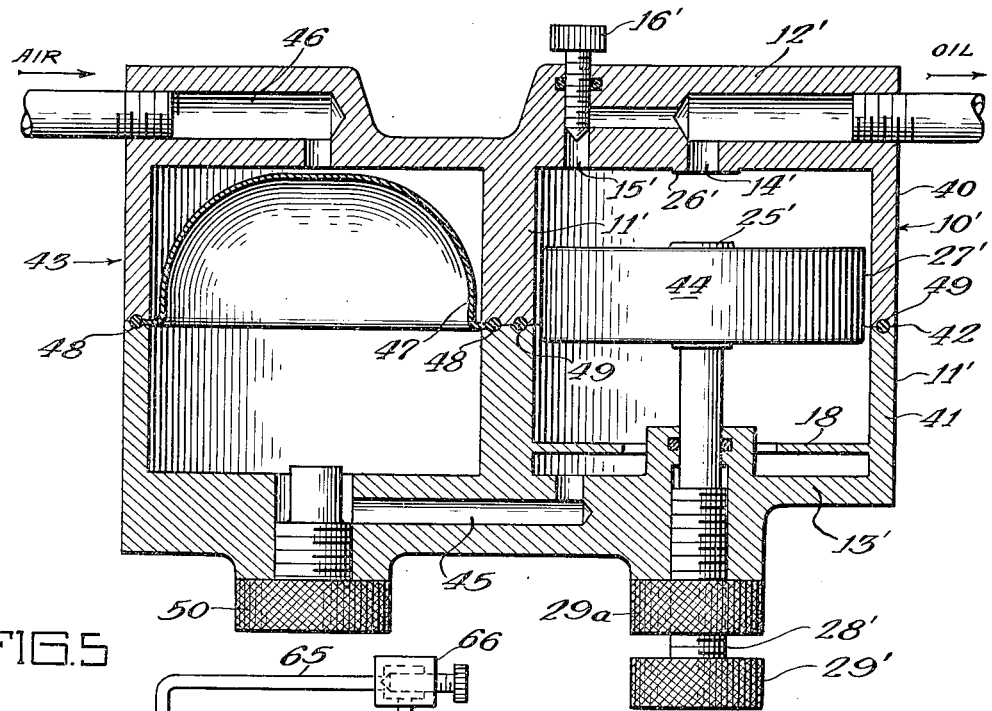
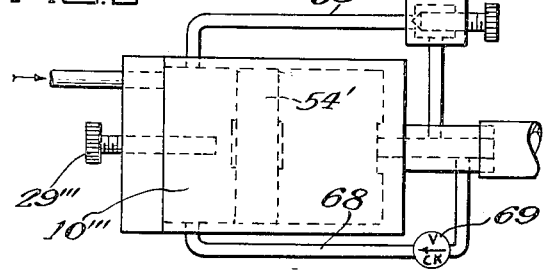
Inventor:
James P. Steibel
By Zabel, Baker, York,
Jones & Dithmar
Attorneys United States Patent Office 3,005,444
Patented Oct. 24, 1961

3,005,444
CONTROL MEANS FOR FLUID ACTUATED
WORK CYLINDERS
James P. Steibel, Racine, Wis., assignor to The Dumore
Company, Racine, Wis., a corporation of Wisconsin
Filed July 27, 1959, Ser. No. 829,701
17 Claims. (Cl. 121—45)

This invention relates to improvements in control means for fluid actuated work cylinders.

It is an object of my invention to provide improved means for controlling the rate and throw of a portion of the work stroke of a fluid actuated work cylinder. In certain applications, it is desired to cause the piston of the work cylinder to advance rapidly up to a certain point and then to move more slowly thereafter. Through analogy to tool applications, these two portions of the work stroke can be referred to as the advance and the feed, since it is customary to cause the tool to advance rapidly up to the work, and then to feed slowly into the work.

A further object is to provide a control means which is separate from the work cylinder itself so that it can be located remotely from the work cylinder and at a point which is readily accessible for purpose of adjustment both of the throw of said advance portion and of the rate of feed of said fed portion.

Still another object is to provide control means of simplified and relatively inexpensive construction.

According to my invention the desired control is provided by a valve member which moves with the movement of the fluid and which can therefore be referred to as a "drifting" valve member, the valve member serving to cut down the flow rate of fluid supplied to the work cylinder.

The drifting valve member is disposed within a cylinder having a principal outlet and a by-pass, the valve member serving to close the principal outlet and thus terminate the advance portion of the work stroke, so that subsequent movement of the piston of the work cylinder is controlled by the rate of fluid flow through the by-pass. The rate of feed may therefore be controlled by a suitable metering valve located in the by-pass, and the extent of the advance may be controlled by stop means which limits the position of the drifting valve in its unoperated position.

According to one embodiment of my invention, the control cylinder is vertically oriented, and the drifting valve is buoyant, and the dimensions of the drifting valve are such that there is a slight clearance between it and the walls of the valve cylinder. This provides substantially frictionless operation due to the clearance, and furthermore, it eliminates the need for machining the valve cylinder.

As a modification, the drifting valve can be slightly heavier than the fluid in which it is suspended, and the control cylinder arrangement inverted with the outlet and the by-pass at the top of the cylinder and the adjustable stop means and inlet at the bottom.

In the first of the above arrangements, the control cylinder can be actuated either by air or by a hydraulic fluid. As applied to shop use, air actuation is preferable for the reason that air is customarily available for other operations, and, in fact, is the customary type of fluid power for work cylinders in inexpensive installations. Thus the present invention is applicable wherever air cylinders are used.

However, the modification can be adapted for air actuation by the addition of a separation chamber, and in this connection, it is a further object of my invention to provide improved separation means which promotes uniformity in rate of feed.

According to a second modification, the floating valve may be in the form of a piston having valve controlled by-passes formed therein to accommodate the flow of fluid which is provided by the peripheral clearance referred to in the previous embodiments. The advantage of this arrangement is that the control cylinder need not be oriented in the vertical direction.

Other objects, features and advantages will become apparent as the description proceeds.

With reference now to the drawings in which like reference numerals designate like parts:

FIG. 3 is a sectional elevation showing a modified form of my invention;

FIG. 4 is a sectional elevation showing a second modification; and

FIG. 5 is an elevation showing a further modification.

Figure 1:
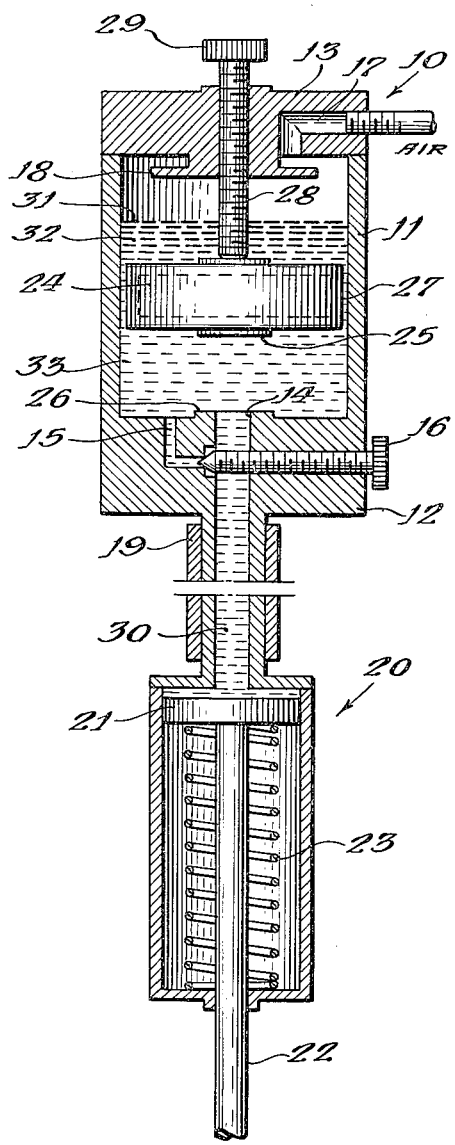
FIG. 1 is a sectional elevation of a preferred embodiment of my invention.
Figure 2:
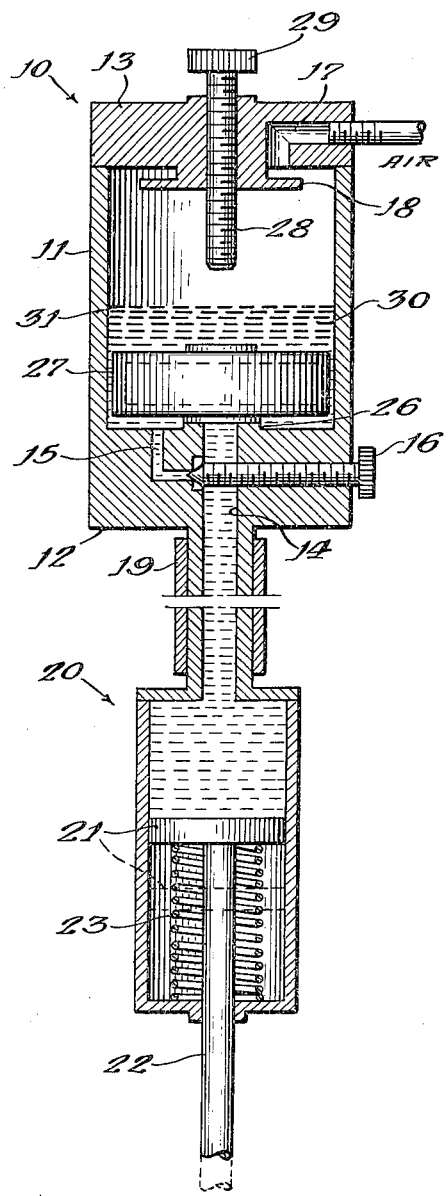
FIG. 2 is a view similar to FIG. 1 but showing the parts in a changed position.

With reference now to FIGS. 1 and 2, the reference numeral 10 comprises the control cylinder and the reference numeral 20 designates the work cylinder. The control cylinder is a closed cylinder comprising a wall 11, an outlet end 12 and an inlet end 13. Formed in the outlet end is a principal outlet 14 and a by-pass outlet 15 of restricted dimensions. A needle valve 16 may be provided to regulate the flow rate through the by-pass outlet 15.

An inlet 17 is provided at the inlet end 13, and a baffle 18 may be provided adjacent the inlet 17.

By-pass outlet 15 communicates at its lower end with the principal outlet 14, and a suitable connection 19, such as a flexible conduit capable of withstanding the pressures involved, connects the lower end of the principal outlet 15 with the work cylinder 20.

The work cylinder 20 is somewhat diagrammatically shown as including a piston 21 and a piston rod 22 which represents the output of the work cylinder 20. A spring 23 is confined between the lower end of the work cylinder 20 and the piston 21 to restore the piston 21 to its unoperated position. Thus, fluid pressure applied to a fluid contained within the control cylinder 10 will cause operation of the work cylinder 20.

Disposed within the control cylinder is a valve member 24 having a surface 25 which engages a valve seat 26 surrounding the principal outlet 14. The valve member is movable between an inoperative position shown in FIG. 1 and an operative position shown in FIG. 2 in which the principal outlet 14 is cut off. However, it will be observed that although the periphery of the valve member 24 conforms generally to the cross section of the cylinder wall 11, that there is a clearance 27 between the two which permits continued flow of the fluid from the inlet side of the valve member 24 through the passageway represented by the clearance 27 and into the by-pass outlet 15, from which the fluid may pass into the work cylinder 20. Thus, the fluid pressure applied at the inlet 17 is available for operation of the work cylinder 20 even though the principal outlet 14 is cut off.

As shown in FIGS. 1 and 2, the valve member 24 is a buoyant valve member with the result that in its inoperative position, the valve surface 25 is separated from the valve seat 26. However, the passageway represented by the clearance 27 is sufficiently small with respect to the rate of flow of the fluid through the principal outlet 14 that the valve member drifts or floats downwardly with the movement of the fluid within the control cylinder 10, until such time as the valve surface 25 engages the valve seat 26.

As shown in FIG. 1, the fluid contained within the control cylinder 10 is a suitable hydraulic fluid or oil 30 which does not completely fill the cylinder, the level being indicated by the interface 31. That portion of the fluid 30 which is disposed on the inlet side of the valve member 24 is designated by the reference numeral 32 and that disposed below by the reference numeral 33.

The operation of the device is illustrated by a comparison between FIGS. 1 and 2. When air is introduced into the cylinder through the inlet 17, a volume of fluid represented by the portion 33 will be forced into the work cylinder 20 at a fairly high flow rate, as determined by the pressure of the air supply, the dimensions of the principal outlet 14, and the viscosity of the fluid 33. However, due to the relationship between the dimensions of the clearance and the other features involved, including the buoyancy of the valve member 24, the valve member will move into its operated position shown in FIG. 2, thus terminating the high flow rate which corresponds to the rapid advance of the piston 21 and piston rod 22. In other words, the difference in the positions of the piston 21 between FIGS. 1 and 2 corresponds to the advance of the work cylinder. Continued application of air pressure will cause further movement of the piston 21 as the portion 32 of the fluid on the inlet side of the valve member is displaced around the valve member and through the by-pass outlet 15 into the work cylinder 20. This further movement of the piston, which corresponds to the feed portion of its work stroke is illustrated by dotted lines in FIG. 2. Due to the restricted dimensions of the by-pass outlet 15, the feed will be at a slower rate, and by suitable adjustment of the needle valve 16, the rate of feed can be controlled within very close limits. Of course, in this embodiment, the extent of the feed portion of the stroke is limited by the volume of fluid 32 which is normally located on the inlet side of the valve member 24. However, by suitable proportioning of the control cylinder 10, any desired extent of feed can be provided.

Extending through the inlet end 13 of the control cylinder 10 is a threaded stop member 28 which limits the upward movement of the valve member 24 into its inoperative position. The stop member 28 may be provided with an adjusting knob 29 so that the position of the stop member can be adjusted, thus regulating the volume of the portion 33 of the fluid normally disposed on the opposite side of the valve member 24. This regulates the extent of the advance portion of the work stroke of the work cylinder 20.

One advantage of the present arrangement is that the control cylinder 10 does not need to be located adjacent to the work cylinder 20. For instance, in numerous applications, the location of the work cylinder is relatively inaccessible, but according to the present invention, the control cylinder which provides means for adjusting the rate of the feed and the extent of the throw may be located at a readily accessible point even though it is remote from the work cylinder itself.

On the return stroke of the work cylinder, the valve member 24 is immediately moved out of its operated position with the result that the return stroke is rapid.

As shown in FIGS. 1 and 2, the work cylinder 20 is a single throw cylinder with a spring return, but the invention is equally applicable to a double throw work cylinder in which the return is effected hydraulically.

Furthermore, the arrangement shown in FIGS. 1 and 2 is suitable for either air actuation or hydraulic actuation; in other words, the fluid pressure applied at the inlet 17 may be that obtained from either an air line or a source of hydraulic pressure.

The operation is substantially the same if the control cylinder of FIGS. 1 and 2 is inverted, and if a sinker valve member is substituted for a buoyant valve member. However, in this instance, the fluid pressure applied at the inlet 17 would have to be hydraulic pressure and not air pressure.

The modification of FIG. 3 shows the inverted type of control cylinder adapted for air actuation. According to this modification, the body of the device may be made in two halves, an upper half 40, and a lower half 41 which are abutted along the parting line 42. The control device includes two chambers, one constituting the control cylinder 10' and the other comprising a separation chamber 43. Certain of the elements of the control cylinder 10' are substantially the same as those described in connection with the embodiment of FIGS. 1 and 2, and are designated by the same reference numerals except that they are primed. However, instead of the buoyant valve member 24, a valve member 44 is provided which is slightly heavier than the hydraulic fluid displaced thereby so that it will tend to sink. Due to the inversion, the drifting movement of the valve 44 is upwardly instead of downwardly.

The inlet for the lower end of the control cylinder comprises a passageway 45 which connects the separation chamber 43 with the control chamber 10'. The upper end of the separation chamber 33 is provided with an air inlet 46. Thus, the separation chamber provides means for applying air pressure to the hydraulic fluid contained with the inverted control cylinder 10'.

Although the air may be applied directly to the hydraulic fluid in the separation chamber by means of an interface as in the case of FIGS. 1 and 2, improved operation is obtained by providing a flexible diaphragm 47 which maintains a more definite separation between the air and the hydraulic fluid. More specifically, it has been found that the provision of a diaiphragm cuts down temperature variations in the hydraulic fluid which variations are found to be a source of variation in the rate of flow since the temperature will affect the viscosity of the fluid. Furthermore, in the case of some hydraulic fluids there is a bubbling tendency which will interfere with the uniform rate of feed under certain circumstances. In many instances, it may take up to a half hour for fine air bubbles to work themselves out of the hydraulic fluid.

The flexible diaphragm 47 may preferably be formed of thin sheet rubber, and be integrally attached to an O-ring 48 which not only maintains the diaphragm in place, but effectively seals the separation chamber at the parting line 42. Similarly, an O-ring seal 49 may be provided for sealing the control cylinder 10'. A removable plug 50 may be provided in the lower portion of the separation chamber to permit filling of the same when reinverted, and removal of the adjustable stop number 28' may serve the same purpose with respect to the control cylinder 10'.

The operation of the FIG. 3 embodiment is substantially the same as the embodiment of FIGS. 1 and 2, except for the fact that the valve member 44 drifts upwardly with the upward flow of the hydraulic fluid instead of downwardly, and except for the fact that the air pressure is applied to the top of the separation chamber instead of to the top of the control cylinder.

A further modification is shown in FIG. 4 in which the control cylinder 10" is horizontally disposed, and in which certain of the other parts are substantially the same as those shown in the embodiment of FIGS. 1 and 2 and are hence designated by the same reference numerals double prime. In this embodiment, the valve member is in the form of a free piston 54 which cooperates with the cylinder wall 11" in the usual manner, instead of providing a clearance as in the case of FIGS. 1 to 3.

The means for permitting the flow of fluid from the inlet side of the piston to the outlet side of the piston is in the form of one or more passageways 56 which are of somewhat restricted dimensions so that prior to the operation of the piston valve member 54, substantially all of the movement of the fluid through the control cylinder 10" will be represented by the movement of the piston 54.

After the operation of the piston valve member 54 the flow of fluid through the cylinder will be represented entirely by the flow of fluid through one or more of the passageways 56, and thence through the by-pass 15" to cause the feed of the work cylinder.

The advantage of this modification is that it can be oriented horizontally, or vertically, or in any other direction.

If desired, a suitable seal 55 may be provided between the piston valve member 54 and the cylinder wall 11". In order to provide for more positive action, the breakaway force of the piston seal 55 may be offset by the provision of a ball check valve 58 in the passageway 56 so as to permit the flow of fluid through the control cylinder 10" in the work stroke direction only after sufficient force has been applied so as to overcome the breakaway force of the piston seal 55 and to cause initial displacement of the piston 54. In actual practice, this means that the passageway 56 will not become operative until after the piston valve member 54 has moved into its operative position to close the principal outlet 14".

Similarly, a ball check valve 58 may be provided for a passageway 57 which operates in the opposite direction so as to insure complete return of the piston valve member 54 into contact with the stop member 28" on the return stroke.

The adjusting nuts 60 and 61 permit adjustment of the spring tension of the ball check valves 58 and 59 to an extent where it will be substantially in excess of the breakaway force of the piston seal 55. Thus, by the use of the piston seal 55 and the ball check valves 58 and 59 there will be no leakage of the hydraulic fluid which would render inaccurate the adjustment of the stop 28" which regulates the extent of the advance of the work cylinder.

The desired control can also be obtained by connecting the oil actuated control cylinder to the exhaust side of a double throw hydraulic work cylinder, or even to both the inlet and exhaust sides where control is desired for both strokes of a double acting double throw hydraulic work cylinder.

In some applications it may be advantageous to prolong the advance at the expense of the feed, as for instance, after a drill has been withdrawn for inspection or chip clearance prior to the time that the bore is completed. In such instances, a second by-pass means can be provided, such as the externally disposed conduit 62, in FIG. 4, which includes a manually operated valve 63. Thus, the operator, by momentarily opening the valve 63, may add to the advance portion of the work stroke; this may be done just as the valve member 54 closes the principal outlet 14", or it may be done prior to this time.

The modification of FIG. 5 is similar to that of FIG. 4, except that the piston seal 55 is omitted together with the passageways 56, 57 and the ball check valves 58, 59. Here the by-pass is in the form of an externally disposed conduit 65 which includes a needle valve 66. Since the conduit 65 bridges the free piston 54', the passageway 56 is not necessary and a return ball check valve 69, corresponding in function to the ball check 59, is located in a second externally disposed conduit 68.

In the FIG. 3 modification, either the control cylinder 10' can be of the upright floater type, or the separation chamber 43 with diaphragm can be inverted, or both inversions can be effected according to circumstances, the arrangement shown having been selected for the purpose of specifically illustrating the sinker type of control cylinder.

A lock nut may be provided for the stop member 28, such as the lock 29a shown in FIG. 3.

When the stop member is screwed up to its limiting position the entire work stroke will be "feed," or when the needle valve 16 is fully closed the entire work stroke will be "advance." The baffle 18 prevents the turbulence or kinetic energy of the fluid entering through the inlet from causing the cocking of the valve member 14 which would tend to cause the same to bind or otherwise interfere with its free drifting movement.

Although only preferred embodiments of my invention have been shown and described herein it will be understood that various modifications and changes may be made in the constructions shown without departing from the spirit of my invention as pointed out in the appended claims.

I claim:

1. Control means for a fluid actuated work cylinder comprising a closed control cylinder, an inlet at one end of said cylinder, a principal outlet at the other end of said cylinder, a by-pass outlet at said other end providing a restricted passageway, both of said outlets being adapted for connection with said work cylinder, a valve member disposed in said cylinder for closing said principal outlet, said valve member moving with a fluid contained in said control cylinder toward the outlet end to close said principal outlet, means permitting the flow of fluid from the inlet side of said valve member through said by-pass outlet, whereby the fluid disposed within the control cylinder, upon application of fluid pressure at said inlet will be caused to flow into said work cylinder prior to the operation of said valve member at a given rate of flow through said principal outlet to cause the advance of said work cylinder, and whereby the rate of flow of fluid from said control cylinder into said work cylinder after the operation of said valve member will be at a lesser rate of flow to cause the feed of said work cylinder, and an adjustable stop member located in said control cylinder and adapted to be engaged by the inlet side of said valve member whereby the throw of said work cylinder under the condition of advance may be regulated.

2. Control means as claimed in claim 1 including a needle valve for said by-pass outlet whereby the rate of flow corresponding to the feed of the work cylinder can be regulated.

3. Control means as claimed in claim 1 in which the axis of said control cylinder is vertically oriented, and in which said means permitting the flow of fluid from the inlet side of said valve member through said by-pass outlet comprises a clearance between the periphery of said valve member and the wall of said cylinder.

4. Control means as claimed in claim 3 in which the specific gravity of said valve member is greater than the specific gravity of said fluid, and in which said principal and by-pass outlets are located at the top of said control cylinder whereby the movement of said valve member into its operated position will be upwardly.

5. Control means as claimed in claim 3 in which said valve member is buoyant and in which said principal and by-pass outlets are located at the lower end of said cylinder so that said valve member will move downwardly into its operated position, and will permit the provision of a free surface for the fluid contained within said cylinder so that said cylinder may be air actuated.

6. Control means as claimed in claim 1 in which said valve member is in the form of a free floating piston which cooperates with the walls of said cylinder, and in which said means permitting the flow of fluid from the inlet side of said valve member through said by-pass outlet comprises a passageway of restricted dimensions formed in said free floating piston.

7. A control cylinder as claimed in claim 6 including a piston seal for said free floating piston, and a spring tensioned ball check valve located in said passageway for permitting the flow of fluid through said passageway only toward the outlet end, the tension of said ball check valve being greater than the breakaway force of said piston seal.

8. Control means as claimed in claim 7 including a second passageway, a spring tension ball check valve disposed in said second passageway for permitting the flow of fluid through said piston only in a direction toward the inlet end, the spring tension of said ball check valve being greater than the breakaway force of said piston seal.

9. Control means for a fluid actuated work cylinder comprising a closed control cylinder oriented in a vertical direction, inlet means at one end of said cylinder, two outlets at the other end of said cylinder adapted for connection with said work cylinder, and a valve member disposed in said cylinder for closing one of said outlets and being in the form of a free piston having clearance with the walls of said control cylinder so as to provide a drifting movement of said valve member toward said outlet end to close said one outlet, whereby the fluid disposed within the control cylinder, upon application of fluid pressure at said inlet means, will be caused to flow into said work cylinder prior to the operation of said valve member through both of said outlets to cause the advance of said work cylinder to occur at a given rate, and will be caused to flow into said work cylinder after the operation of said valve member through only one of said outlets to cause the feed of said work cylinder to occur at a lesser rate.

10. Control means as claimed in claim 9 in which said inlet means includes a baffle so that the kinetic energy of fluid passing through said inlet means will not cause cocking of said valve member.

11. In combination, a hydraulically actuated work cylinder, a remotely located closed control cylinder oriented in a vertical direction, inlet means at one end of said cylinder, two outlets at the other end of said cylinder, conduit means connecting said two outlets with the inlet of said work cylinder, and a drifting valve member disposed in said cylinder for closing one of said outlets and having clearance with the walls of said control cylinder so as to provide a drifting movement of said valve member toward said outlet end to close said one outlet whereby the fluid disposed within the control cylinder, upon application of fluid pressure at said inlet means, will be caused to flow into said work cylinder prior to the operation of said valve member through both of said outlets to cause the advance of said work cylinder to occur at a given rate, and will be caused to flow into said work cylinder after the operation of said valve member through only one of said outlets to cause the feed of said work cylinder to occur at a lesser rate.

12. The combination of claim 11 in which said control cylinder includes means to regulate the throw of said work cylinder.

13. The combination of claim 11 in which said control cylinder includes means to regulate the rate of feed of said work cylinder.

14. Control means for a fluid actuated work cylinder comprising a separation chamber and a closed control cylinder, an inlet at one end of said cylinder communicating with the outlet end of said separation chamber, a principal outlet at the other end of said cylinder, a by-pass outlet at said other end providing a restricted passageway, a valve member disposed in said cylinder and movable between an unoperated position in which it is spaced from said principal outlet and an operated position in which it closes said principal outlet, said valve member moving with the movement of a hydraulic fluid contained in said cylinder, and means permitting the flow of fluid from the inlet side of said valve member through said by-pass outlet, whereby the fluid disposed within the control cylinder, upon application of fluid pressure at said inlet, will be caused to flow into said work cylinder prior to the operation of said valve member at a given rate of flow through said principal outlet to cause the advance of said work cylinder, and whereby the rate of flow of fluid from said control cylinder into said work cylinder after the operation of said valve member will be at a lesser rate of flow to cause the feed of said work cylinder, said separation chamber being oriented with its axis in a vertical direction and having an air inlet at the upper end thereof, the lower end constituting said outlet end, whereby a hydraulic fluid contained in said separation chamber will communicate with the hydraulic fluid in said control cylinder so that air introduced under pressure through said air inlet will force said hydraulic fluid into said control cylinder to cause operation of the same.

15. Control means for a fluid actuated work cylinder comprising a separation chamber and a closed control cylinder, an inlet at one end of said cylinder communicating with the outlet end of said separation chamber, a principal outlet at the other end of said cylinder, a by-pass outlet at said other end and providing a restricted passageway, a valve member disposed in said cylinder and movable between an unoperated position in which it is spaced from said principal outlet and an operated position in which it closes said principal outlet, said valve member moving with the movement of a fluid contained in said cylinder, said separation chamber having an air inlet at one end thereof, the other end constituting said outlet end, and diaphragm means located in said separation chamber to maintain separation of air supplied through said air inlet and a hydraulic fluid disposed in said separation chamber and in said control cylinder, said diaphragm being flexible to permit the pressure of the air supplied to be transmitted to the hydraulic fluid contained in said separation chamber and said control cylinder to cause operation of said valve member whereby subsequent flow of said hydraulic fluid into said work cylinder will occur only through said by-pass outlet.

16. Control means for a fluid actuated work cylinder comprising a closed control cylinder, an inlet at one end of said cylinder, principal outlet means at the other end of said cylinder, said principal outlet means being adapted for connection with said work cylinder, a valve member disposed in said cylinder for closing said principal outlet means, said valve member moving with a fluid contained in said control cylinder toward the outlet end to close said principal outlet means, adjustable stop means located at the inlet end for engagement by said valve member, and means by-passing said principal outlet means and said valve member when in closed position, whereby the fluid disposed within the control cylinder, upon application of fluid pressure at said inlet means, will be caused to flow into said work cylinder prior to the operation of said valve member through said principal outlet means to cause the advance of said work cylinder to occur at a given rate, and will be caused to flow into said work cylinder after the operation of said valve member through said by-pass means to cause the feed of said work cylinder to occur at a lesser rate, said by-pass means including valve means to regulate the flow of fluid which controls the feed.

17. Control means as claimed in claim 16 including a second by-pass means, by-passing said first by-pass means said second by-pass means including a valve movable between open and closed positions whereby, when said valve is opened, the control of the feed by said first by-pass means can be rendered ineffective in order to prolong the advance.

References Cited in the file of this patent

UNITED STATES PATENTS

| | | |
|---|---|---|
| 706,688 | Reynders | Aug. 12, 1902 |
| 833,632 | Ridgway | Oct. 16, 1906 |
| 990,530 | Dufty | Apr. 25, 1911 |
| 1,812,533 | Hunt | June 30, 1931 |
| 2,067,492 | Kingsbury | Jan. 12, 1937 |
| 2,541,464 | Davies | Feb. 13, 1951 |
| 2,618,292 | Ring | Mar. 18, 1952 |
| 2,796,080 | Presnell | June 18, 1957 |
| 2,923,277 | Waterman | Feb. 2, 1960 |